United States Patent [19]
Shibata et al.

[11] Patent Number: 5,332,168
[45] Date of Patent: Jul. 26, 1994

[54] PHOTOGRAPHIC FILM CASSETTE WITH IMPROVED SEPARATOR CLAW

[75] Inventors: Tadayoshi Shibata; Masuhiko Hirose, both of Kanagawa, Japan

[73] Assignee: Fuji Photo Film Co., Ltd., Kanagawa, Japan

[21] Appl. No.: 859,888

[22] Filed: Mar. 30, 1992

[30] Foreign Application Priority Data

Apr. 1, 1991 [JP] Japan .................. 3-094701
Nov. 27, 1991 [JP] Japan .................. 3-312393

[51] Int. Cl.$^5$ .................................. G03B 1/00
[52] U.S. Cl. .......................... 242/348.3; 242/348.4
[58] Field of Search .................... 242/71.1, 71.8; 354/275

[56] References Cited

U.S. PATENT DOCUMENTS

| | | | |
|---|---|---|---|
| 4,834,306 | 5/1989 | Robertson et al. | 242/71.1 |
| 4,846,418 | 7/1989 | Fairman | 242/71.1 |
| 4,883,236 | 11/1989 | Niedospial, Jr. et al. | 242/71.1 |
| 4,938,429 | 7/1990 | Robertson et al. | 242/71.1 |
| 5,013,853 | 7/1991 | Jensen | 242/71.1 |
| 5,049,912 | 9/1991 | Pagano | 242/71.1 |
| 5,102,062 | 4/1992 | Bush | 242/71.1 |
| 5,181,672 | 1/1993 | Kataoka | 242/71.1 |
| 5,213,277 | 5/1993 | Takahashi et al. | 242/71.1 |
| 5,226,613 | 7/1993 | Kataoka et al. | 242/71.1 |

FOREIGN PATENT DOCUMENTS 2921379 11/1980 Fed. Rep. of Germany.

*Primary Examiner*—Daniel P. Stodola
*Assistant Examiner*—Eileen A. Dunn
*Attorney, Agent, or Firm*—Sughrue, Mion, Zinn, Macpeak & Seas

[57] ABSTRACT

A photographic film cassette has a spool around which photographic film is wound in a roll. A cassette shell rotatably contains the spool in a roll chamber. A flexible leader separator is disposed between the roll chamber and a film passageway. The separator is in contact with the outside of the roll of the film, and abuts upon a film leading end during rotation of the spool in the unwinding direction, so as to be flexed during usage. A film leader is separated from the roll, and is advanced outward through the passageway. In a preferred embodiment, a pair of guide members are disposed within the passageway, and are in contact with the film in transporting the film out of/into the cassette shell. Though the cassette shell is molded from non-crystalline resin, these guide members are molded from crystalline resin so as to prevent the film from being damaged. A coaxial pair of rollers may be disposed inward from the passage mouth for supporting an emulsion surface of the film while the film is transported out of/into the roll chamber.

16 Claims, 11 Drawing Sheets

PHOTOGRAPHIC FILM CASSETTE WITH IMPROVED SEPARATOR CLAW

BACKGROUND OF THE INVENTION

Field of the Invention

The present invention relates to a photographic film cassette of which rotation of a spool causes photographic film to advance to the outside of a cassette shell, more particularly to an improvement of the cassette shell for protecting the film from damage.

Description of the Related Art

A known photographic film cassette includes a photographic filmstrip (hereinafter referred to as film) positioned so that a film leader does not protrude from a cassette shell prior to loading the cassette in a camera. Such a device is disclosed in U.S. Pat. No. 4,846,418 and 4,834,306. Simple film-advancing mechanisms of the camera are used with this type of cassette, including a construction which rotates a spool so as to unwind the film, thereby causing the leader to move through a film passageway and exit from the cassette.

A spool of such a cassette, on which the film is wound in a roll, is rotatably contained in a cassette shell. A pair of annular ridges are formed inside the cassette shell for preventing the roll from loosening. A separator claw is formed within the cassette shell between the film passageway and the roll chamber so as to be in contact with the outermost surface of the roll. The annular ridges and the separator claw are positioned so as to contact the film outside of areas for recording images, e.g. proximate the perforations, thus preventing the ridges and the claw from scratching the image recording areas. When the spool is rotated in the unwinding direction, the roll of the film is prevented from loosening by the annular ridges so as to cause the roll to rotate together with the spool. When a leading end of the leader has rotated up to a position close to the film passageway, it abuts the separator claw, which separates it from the roll and directs it into the passageway toward the outside of the cassette. The cassette disclosed in U.S. Pat. No. 4,938,429 has a separator claw moving mechanism, which moves the separator claw to a position for guiding the leader by moving in concert with an opening of the film passageway.

The separator claw of the cassette above is, however, in constant contact with the emulsion surface of the outermost turn of film and the back surface of the second outermost turn of film even after causing the leading end to advance. This construction is disadvantageous in that the friction between the film and the separator claw is considerably large and thus resistant to the advancement of the film. There is another problem in that the longitudinal edges of the film might be damaged or scratched. It has been proposed to utilize these longitudinal edges for recording data thereon in an optical or magnetic manner. Accordingly, it is desirable to avoid damage to the lateral edges. The above-mentioned problems exist in the cassette of U.S. Pat. No. 4,938,429 because the separator claw is immovable and unretractable during advancement of the film.

Also, because such a cassette has a considerably complicated interior structure, tight dimensional tolerances are required. The cassette shell is molded from a resin which is easily and precisely moldable free from substantial warpage or sinkmarks, and yields a highly rigid product, e.g. a styrene resin such as polystyrene, ABS resin, or polycarbonate resin. However, such resins are relatively low in abrasion resistance. When the film is advanced or rewound, the film may be scratched by contact with the inside of the cassette shell or the cassette may be worn so as to give rise to dust on the inside surfaces of the film passageway or other portions of the cassette.

SUMMARY OF THE INVENTION

In view of the foregoing problems, an object of the present invention is to provide a photographic film cassette in which the surfaces of photographic film are not damaged while the film is advanced.

Another object of the present invention is to provide a photographic film cassette having a cassette shell which will not wear down through contact with the film.

In order to achieve the above, the other objects and advantages of this invention, a photographic film cassette of the present invention has a separator member disposed between a roll chamber and a film passageway through which photographic film passes after leaving a roll chamber. The separator member is in contact with an outside of a roll of the film so as to abut upon a leading end of the leader of the film during rotation of a spool in an unwinding direction. The separator member thus separates the leader from the roll, rotating together with the spool, so as to advance the leader to an exterior of a cassette shell through the passageway. The separator member is highly elastic so as to be flexible when abutting upon the leading end of the film. Accordingly, the separator member is not highly resistant to advancement of the film, because of its flexibility. Also, the longitudinal edges of the film are not damaged or scratched despite the constant contact of the separator member with the emulsion surface as the film is transported.

In accordance with a preferred embodiment, a contact means is disposed within the cassette shell for contact with the film in transporting the film out of or into the cassette shell through the passageway. The contact means is molded from a crystalline resin for preventing the film from being damaged, whereas the cassette shell is molded from a non-crystalline resin. In another preferred embodiment, roller means is disposed in the passage mouth for supporting one surface of the film when the film is drawn out of and/or rewound into the roll chamber through the passage mouth in order to prevent the film from being damaged. When the film is advanced or rewound, the film is not scratched by contact with the inside of the cassette shell, and does not give rise to dust, due to the contact of the film with the crystalline-resinous contact means or the roller.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT

Figure 1:
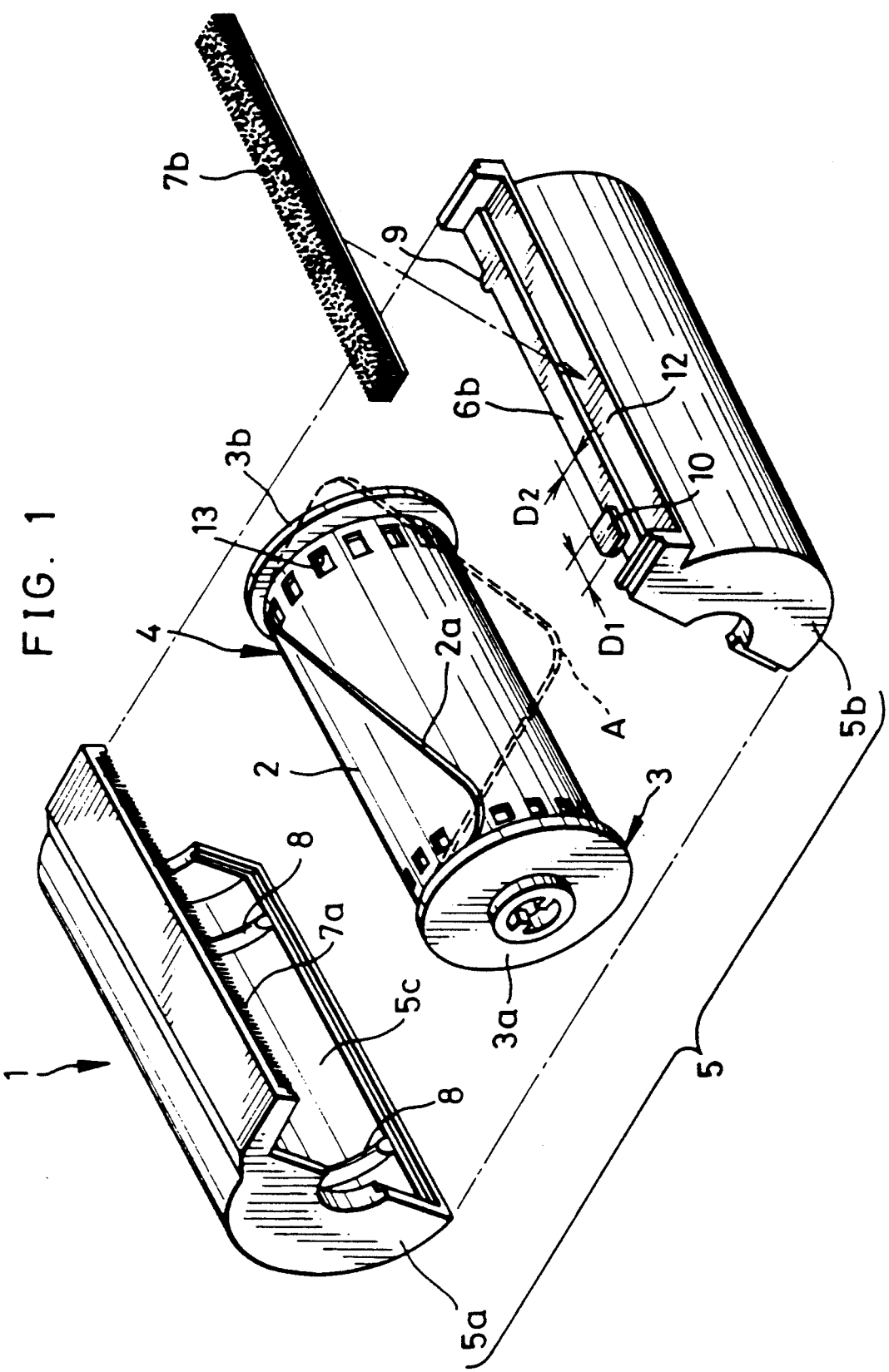
FIG. 1 is an exploded perspective view illustrating a film cassette according to the first preferred embodiment of the invention.

FIG. 1 illustrates a photographic film cassette 1 according to the first preferred embodiment of the present invention. 135-type photographic film is wound around a spool having flanges 2a and 3b formed on both ends thereof, so as to be in the form of a roll 4 with the emulsion surface of the film wound inward. A trailer of the film 2 is anchored on a core of the spool 3, which is rotatably contained in a cassette shell 5. The cassette shell 5 is constituted of a pair of shell halves 5a and 5b, respectively, molded from a plastic material, e.g. high-impact polystyrene resin (HIPS). Carbon black is also included in the plastic material for the shell halves 5a and 5b, so as to provide a light-tight property. A film passageway 6 is formed between the shell halves 5a and 5b, and defined between upper and lower passage surfaces 6a and 6b (see FIG. 2). Conventional light-trapping fabric pieces 7a and 7b are attached to the passage surfaces 6a and 6b in order to prevent light from entering a roll chamber 5c inside the cassette shell 5.

A pair of arcuate ridges 8 are integrally formed on an inside surface of the upper shell half 5a except for the upper passage surface 6a. Also, a pair of arcuate ridges 9 are integrally formed on the lower shell half 5b so as to be continuous with the ridges 8 when the cassette is assembled. The ridges 8 and 9 are in contact with the outer surface of the roll 4 at positions slightly inward from perforations 13 formed on both longitudinal edges of the film 2. Accordingly, the roll 4 is prevented, by the ridges 8 and 9, from loosening relative to the spool 3 when the spool 3 is clockwise rotated.

A leader separator 10 is attached to the lower surface 6b at a position in line with the left-hand arcuate ridge 9. The distal end of the separator 10 is in constant contact with the outermost turn of the roll 4 when the film 2 is fully wound around the spool 3. The separator 10 abuts on a leading end A of the leader 2a during contact with the rotating outermost turn, and separates the leader 2a from the roll 4 so as to direct it toward a film passage mouth 12 and through the passageway 6.

The separator 10 is made of a sheet of a material having elasticity higher than that of the material of the cassette shell 5, e.g. polypropylene (PP), polyethylene (PE), polyvinyl chloride (PVC), polybutylene terephthalate (PBT), polyethylene terephthalate (PET), and nylon. The plastic sheet for the separator 10 is not substantially deformed due to application of a force sufficient for separating the leader 2a from the roll 4, e.g. 50 gf or below. However, the separator 10 will yield enough so that the film 2 will not be damaged. The separator 10 has a width $D_1$ that is 4 mm in order to prevent the separator 10 from catching the perforations 13, which are each approximately 3 mm long. Its projecting degree $D_2$ is 2 mm, and its thickness is 0.2 mm. The corners of the distal ends are rounded off at a radius of curvature R of at least 0.2mm, as seen in FIG. 1.

Figure 2:
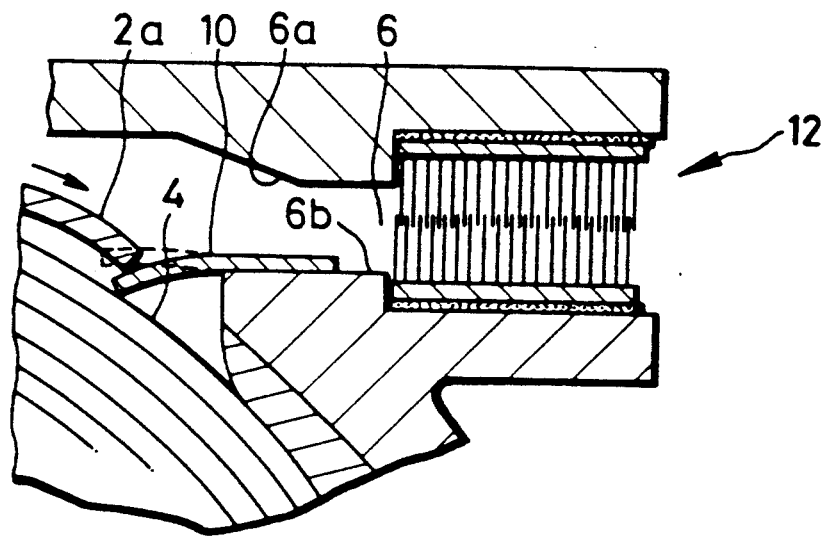
FIG. 2 is a cross section illustrating a manner in which a leader separator is attached.

The operation of the above-constructed cassette 1 will now be described. In a state where the entire film 2 is wound within the cassette shell 5, the spool 3 is rotated in the clockwise direction. The roll 4 rotates together with the spool 3 because the ridges 8 and 9 keep contact with the outermost surface of the roll 4. When the leading end A of the leader 2a approaches the separator 10, further rotation of the spool 3 causes the leading end A on the left side to abut on the separator 10 and to be separated thereby from the roll 4 as illustrated in FIG. 2. The leader 2a is thus advanced to the outside of the cassette shell 5 through the passage mouth 12.

The separator 10 is always in contact with the emulsion surface of the outermost turn of the photographic film roll or with the back surface of the penultimate turn of photographic film. However, the separator 10 does not damage the photographic film, because it reliably flexes in response to the contact force between itself and the film.

Experiments were conducted relating to the use of a sheet of PET for the separator 10. The width $D_1$ was set to be 4 mm and the projecting degree $D_2$ to be 2 mm, the thickness was varied. Results were obtained as below. The degree of flexing the distal end of the separator 10 was measured in mm under the force of 50 gf. The "separation success rate" was represented by the number of times, in which separation of the leader was successful, out of 10 attempts by rotating the spool.

TABLE 1

| Thickness (in mm) | Distal Flexure degree (in mm) | Separation success rate | Scratches |
|---|---|---|---|
| 0.1 | 1.2 | 7 | None |
| 0.2 | 0.3 | 10 | None |
| 0.3 | 0.1 | 10 | None |
| 0.4 | 0.0 | 10 | Recognized |

As is indicated in Table 1, it is desired that the PET separator 10 have a thickness from 0.1 mm to 0.3 mm inclusive. The modulus in flexure of materials used for separator 10 (in kg/mm2) are known as shown in Table 2, as approximated values:

TABLE 2

| Filing PP | 34 |
|---|---|
| General-purpose PE | 31 |
| PVC alloy | 26 |
| Non-reinforced PBT | 26 |
| Non-reinforced PET | 22 |
| Nylon 66 | 22 |

The distal flexure degree is substantially proportional to the modulus in flexure. Because the distal flexure degree is 1.2 mm when the PET separator is 0.1 mm thick according to Table 1, the distal flexure degree of a PP separator having the same size is calculated according to Table 2 as:

$$1.2 \times 22 / 34 = 0.8 \text{ (mm)}$$

It is estimated that the use of a PP separator will result in degrees of the separation success rate and scratches similar to the PET separator. It is therefore desired that a separator formed from the elastic plastics materials other than PET have a thickness of 0.3 mm or less.

Figure 3:
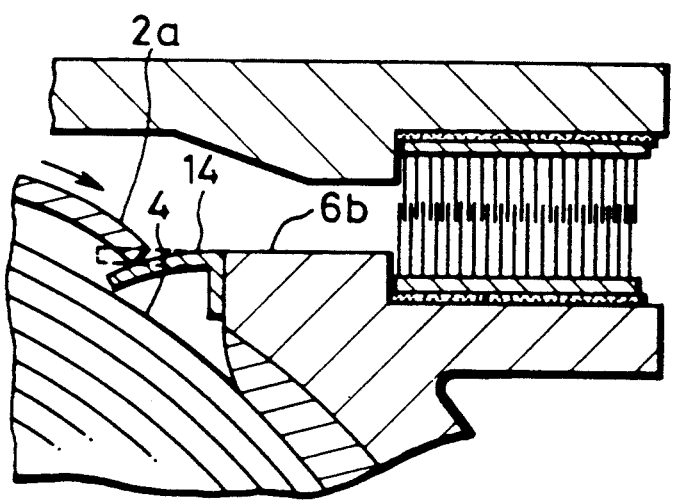
FIGS. 3 and 4 are cross sections illustrating the separator of the second and third preferred embodiments respectively.

FIG. 3 illustrates a second preferred embodiment having a separator 14, which is formed from a similar material similar in size to the separator 10 of the first embodiment. However, separator 14 is bent and attached to the roll chamber 5c at a position immediately inward of the passage lower surface 6b.

Figure 4:
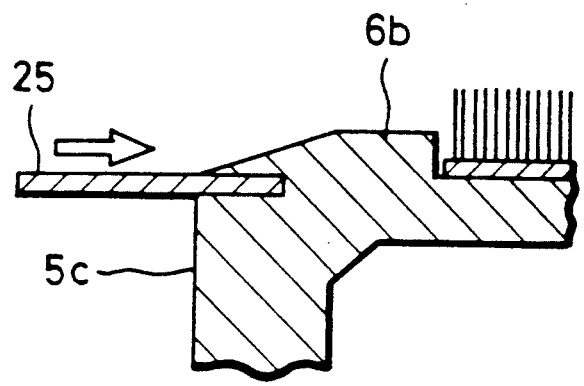
Figure 5:
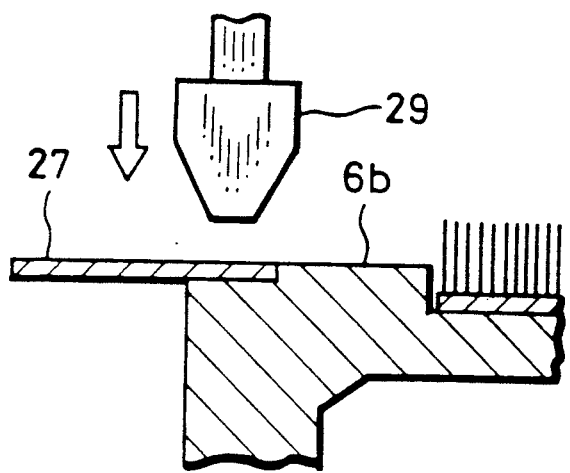
FIG. 5 is a cross section illustrating a manner in which a separator is attached according to a fourth preferred embodiment, together with a thermal head.
Figure 6:
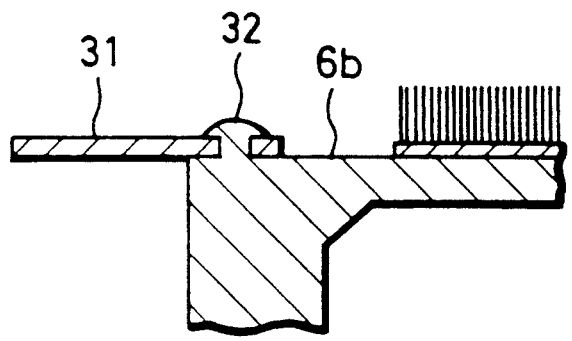
FIGS. 6 and 7 are cross sections illustrating manners in which a separator is attached according to fifth and sixth preferred embodiments respectively.
Figure 7:
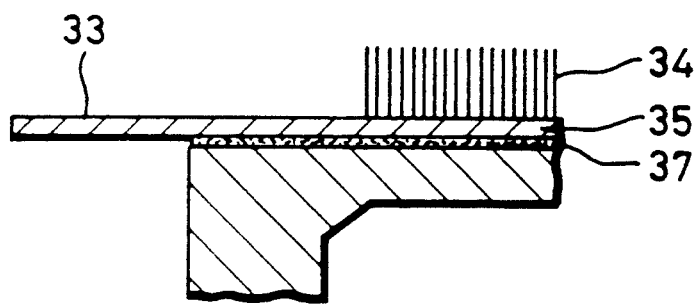

FIGS. 4 to 7 illustrate various methods of fixing a separator sheet on the inside of the cassette shell 5 constituting further embodiments of the invention. A separator 25 illustrated in FIG. 4 is fixed according to insert molding in the roll chamber 5c. A separator 27 illustrated in FIG. 5 is thermowelded or ultrasonically welded to the lower surface 6b by welding head 29. A separator 31 in FIG. 6 has a hole, which receives a projection 32 formed on the lower surface 6b to rivet or caulk the separator 31 on the lower surface 6b. A separator 33 in FIG. 7 is an extension of the base fabric 35 of light-trapping fabric 34, and is attached to the lower surface 6b with adhesive agent 37.

Figure 8:
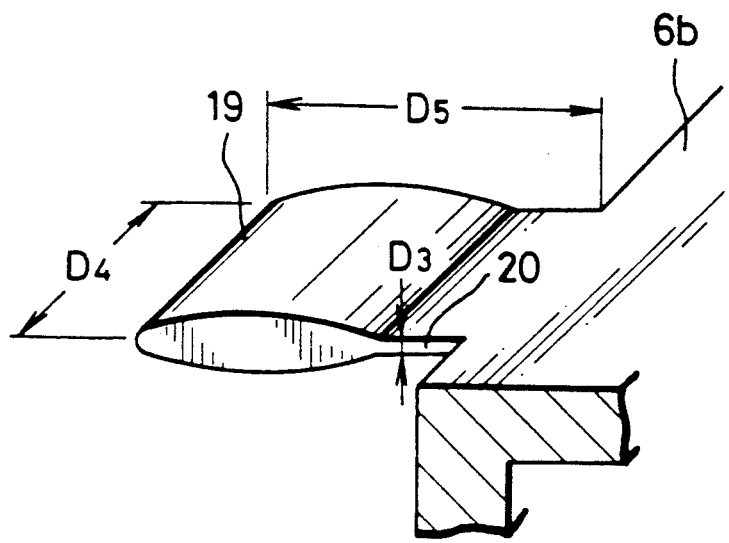
FIG. 8 is a perspective view illustrating a separator formed integrally with the cassette shell according to a seventh preferred embodiment.
Figure 9:
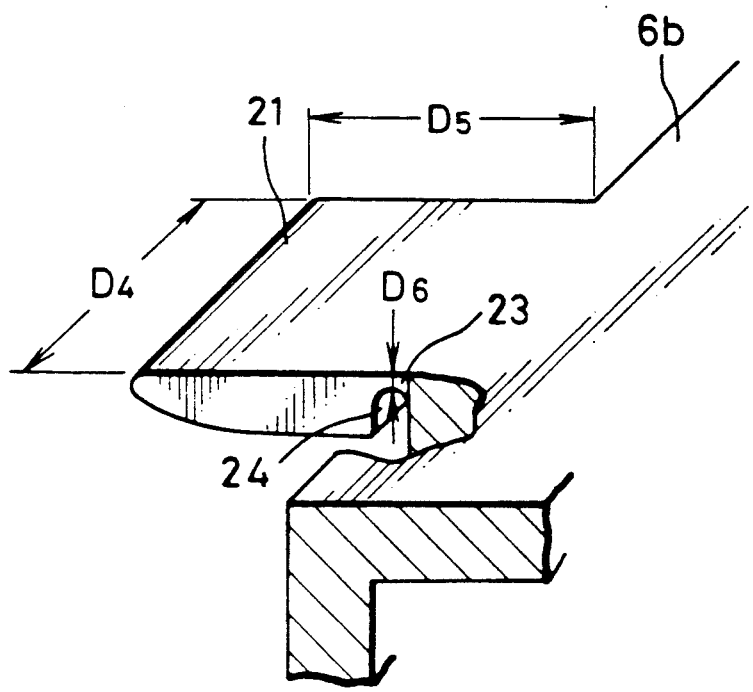
FIG. 9 is a perspective view illustrating a separator according to an eighth preferred embodiment.

Referring to FIGS. 8 and 9, a separator according to further preferred embodiments is formed integrally with the lower shell half 5b. A separator 19 in FIG. 8 has a distal edge rounded off so as to soften contact with the film, and a connecting thin portion 20 which connects together the separator 19 and the lower surface 6b. The thickness $D_3$ of this portion 20 is as small as 0.2 mm so as to impart additional flexibility to the separator 1.9 in the direction vertical to transportation of the film 2. Its width $D_4$ is 4 mm, equal to that of the former $D_1$, whereas its projecting degree $D_5$ is 2 mm, equal to $D_2$. A separator 21 in FIG. 9 has a groove 24 defining a thin portion 23 interconnecting the separator 21 and the lower surface 6b. The thickness $D_6$ of the thin portion 23 is as small as 0.2 mm.

The separator according to the present invention is not limited by the materials or the shapes described in the former embodiments, but may be formed of any shape and of any material so as to have sufficient elasticity in order to prevent scratching of the film balanced with sufficient rigidity for reliable leader separation.

When the film is advanced from, or rewound into, a cassette shell, the film rubs against the film chamber and the film passage surfaces. It is possible that this might scratch the film or give rise to dust due to wearing of the resin. A cassette 22, according to a further embodiment, is illustrated in FIGS. 10 to 14. Two pairs of guide members 15a, 15b, 16a and 16b are attached to surfaces 6a and 6b with an adhesive agent. Guide members 15a, 15b, 16a, and 16b are each molded, from a crystalline resin, separately from the cassette shell 5, and are in contact with both lateral sides of the film 2 in order to guide the leader 2a toward the passage mouth 12 without contacting image frames or image recording areas 2b on the film 2. It is noted that the plush 7a and 7b is omitted from illustration in FIG. 13 for the purpose of clarity.

The guide members 15a, 15b, 16a and 16b are molded from a low frictional resin e.g. high-density polyethylene (HDPE) named LUBMER (merchandise name; manufactured by Mitsui Petrochemical Industries, Ltd.), so as to avoid wearing down the film 2 during contact therebetween. Instead of using HDPE for the guide members, other crystalline resins such as polyacetal, fluorocarbon, polyphenylene sulfide, polyamide, polyether ether ketone and PBT, and polymer alloys of certain of these resins, may also be used. It is preferable to add a reinforcer such glass fiber and carbon fiber, and a lubricant such as silicone oil, molybdenum disulfide, and fluorocarbon powder to the resin.

Figure 10:
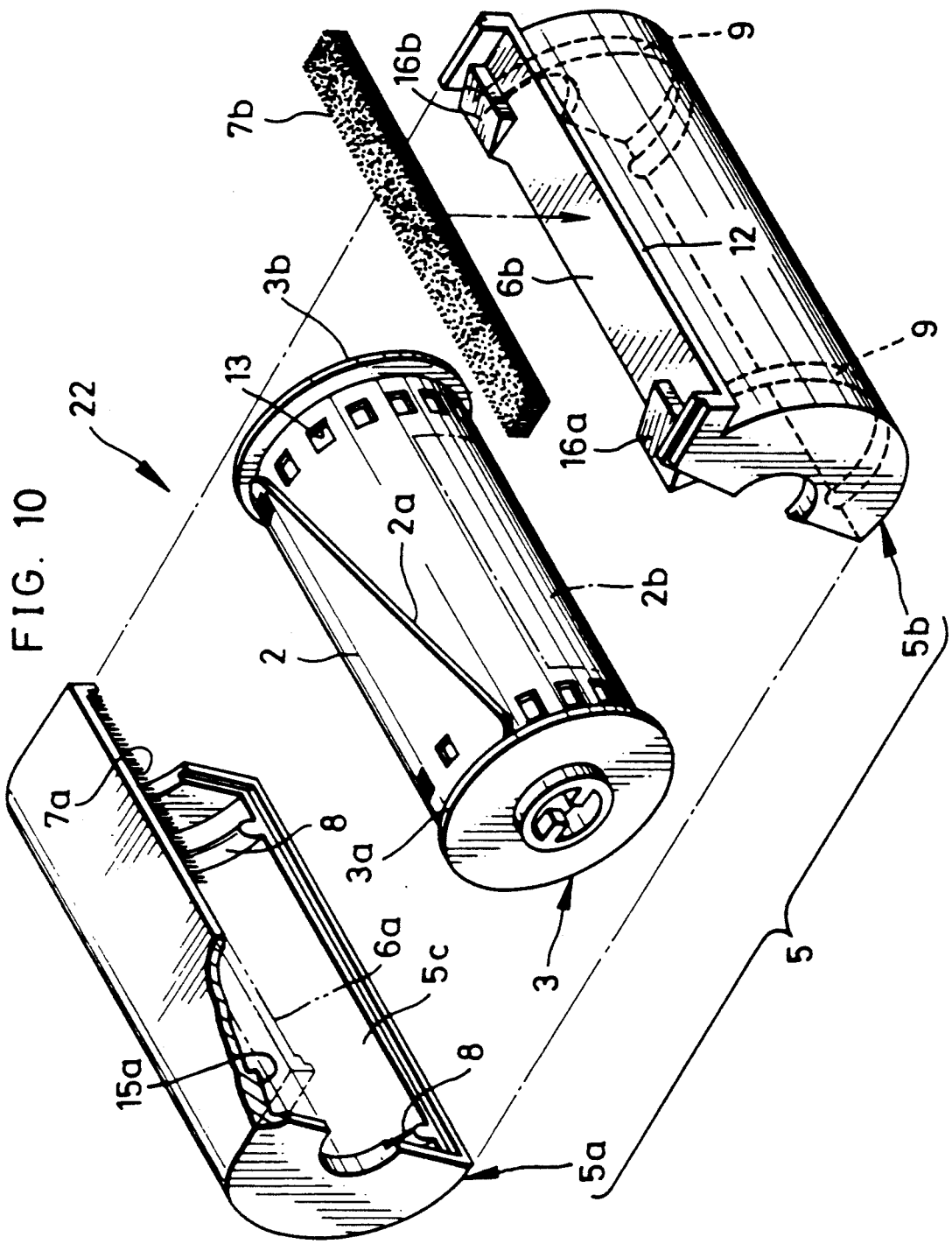
FIG. 10 is an exploded perspective view illustrating a cassette of the ninth embodiment having crystalline-resinous guide members.
Figure 11:
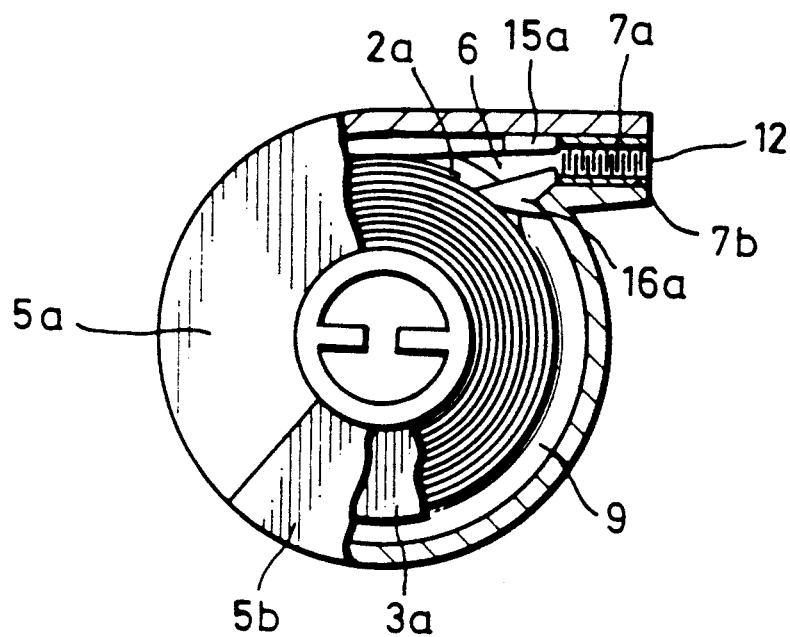
FIG. 11 is a front elevation, partially cutaway, illustrating a manner in which the guide members are fixed.
Figure 12:
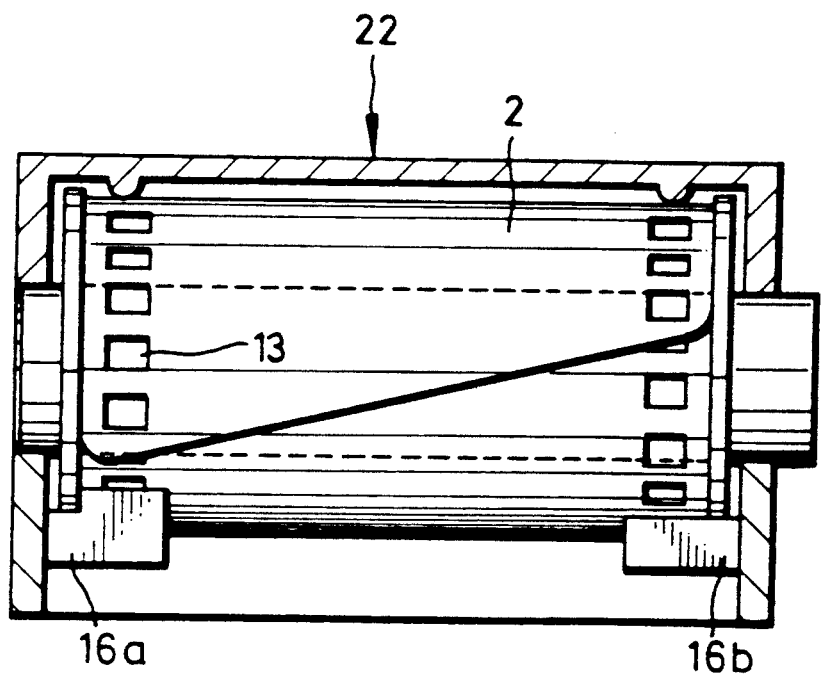
FIG. 12 is a vertical section illustrating the manner of fixing the guide members.
Figure 13:
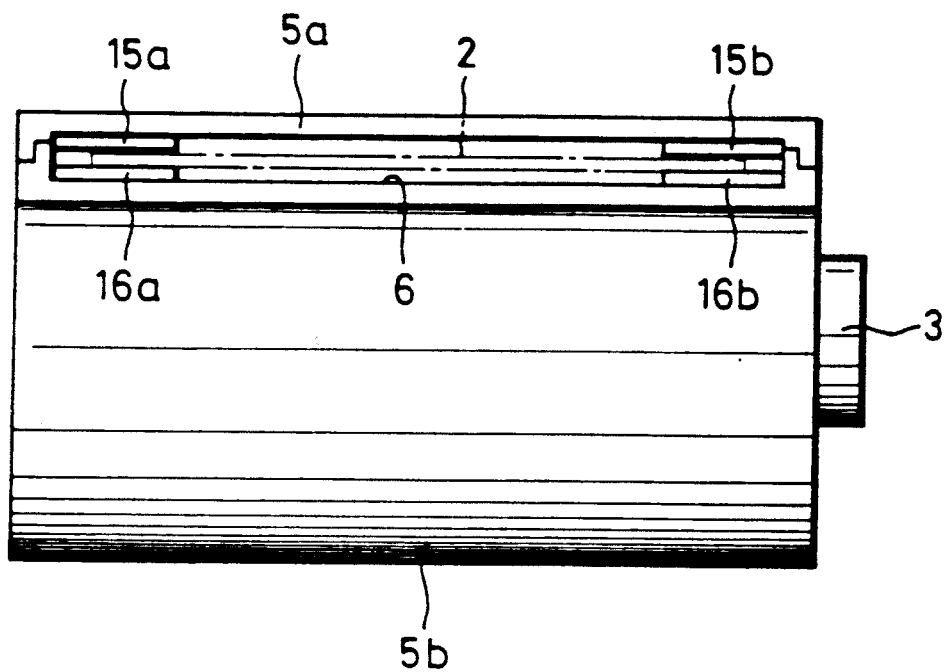
FIG. 13 is a side elevation illustrating a manner in which the guide members are disposed in the film passageway.

The upper surfaces of the guide members 16a and 16b are inclined (upward in FIG. 10) so as to increase in height toward the passage mouth 12 as illustrated in FIG. 10. The lower surfaces of the guide members 15a and 15b are inclined downward toward the passage mouth 12, in a similar manner. The leader 2a is thereby smoothly directed to a position between the light-trapping fabric pieces 7a and 7b. The length of the guide members 15a, 15b, 16a and 16b is set to be considerably large, as illustrated in FIG. 12, preferably larger than the length of the perforations 13. The guide members 15a, 15b, 16a and 16b are therefore prevented from becoming engaged in the perforations 13 while the film 2 is advanced or rewound. Although the inclined surfaces of the four guide members of this embodiment are smooth, a number of fine ridges or fine grooves may be formed thereon at a small pitch so as to prevent dust, stuck on the film 2, from scratching the film 2.

The inward edge of the lower left-hand guide member 16a consists of a separator claw which abuts on the leading end A to separate the leader 2a from the roll 4. The width of the guide member 16a in the film passing direction is therefore larger than that of the other guide members 15a, 15b and 16b. The four positions of the guide members 15a, 15b, 16a and 16b correspond to the ends of the arcuate ridges 8 and 9.

Figure 14:
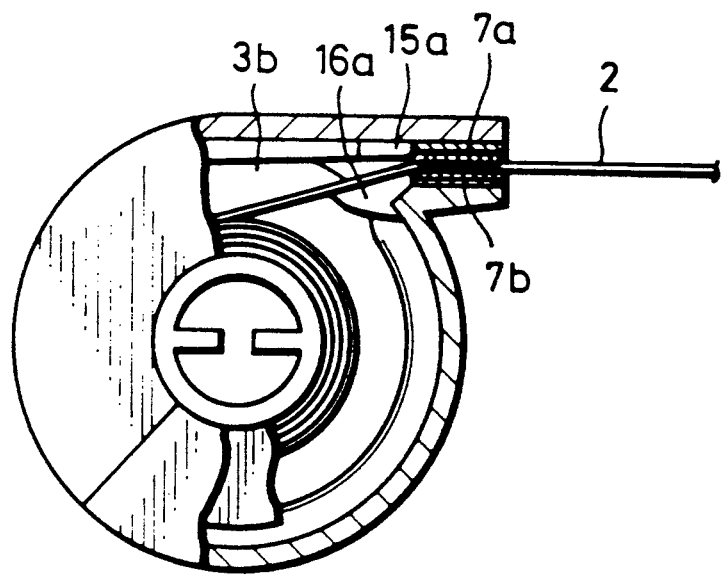
FIG. 14 is a front elevation, partially cutaway, illustrating a manner in which the film is advanced.

Referring to the operation of the cassette 22, the leader 2a is separated by the separator edge of the guide member 16a from the roll 4 when the leading end A has rotated up to the guide member 16a. The leader 2a is slid while in contact with the inclined surface of the guide member 16a and is passed between the fabric pieces 7a and 7b. The leader 2a is then advanced outside the passage mouth 12. While the film 2 exits and is drawn from the cassette shell 5, scratches will not form raised on the film 2, as the film 2 is passed smoothly on the guide members 16a and 16b as illustrated in FIG. 14.

Figure 15:
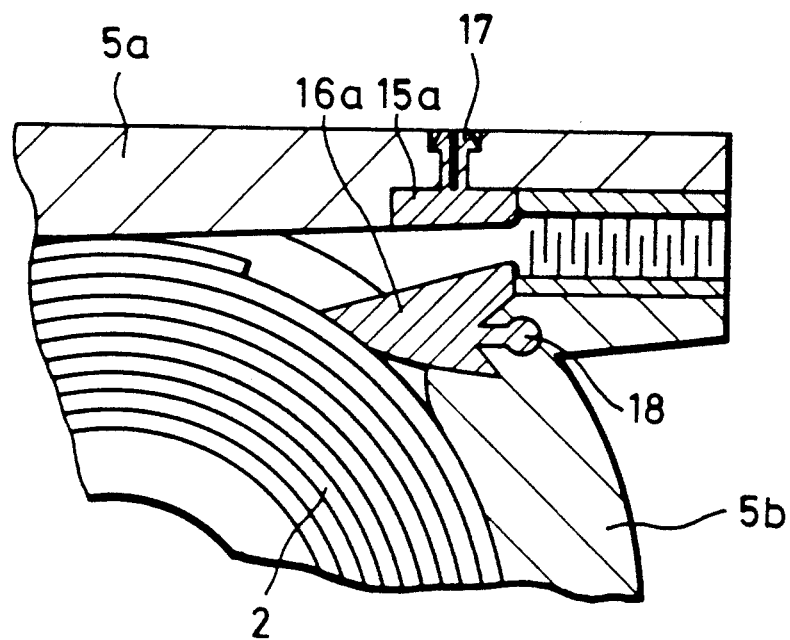
FIG. 15 is a cross section illustrating a variant manner of fixing the guide member.

Also, during rewinding of the film 2 into the cassette shell 5 after effecting all exposures thereon, no scratches will form as the film 2 is smoothly passed on the guide members 16a and 16b. It is noted that the four guide members 15a, 15b, 16a and 16b are disposed on extreme lateral sides within the passageway 6. However, they may be formed in positions deviated inward from the extreme sides to a small degree so that the image recording areas 2b can be protected from contact with the upper and lower surfaces 6a and 6b of the passageway 6 during transport of the film 2. It is noted that, as illustrated in FIG. 15, arresting projections 17 and 18 may be formed on the guide members 15a, 15b, 16a and 16b, so as to secure guide members 15a, 15b, 16a and 16b on the shell halves 5a and 5b by virtue of engagement with recesses formed in shell halves 5a and 5b.

Figure 16:
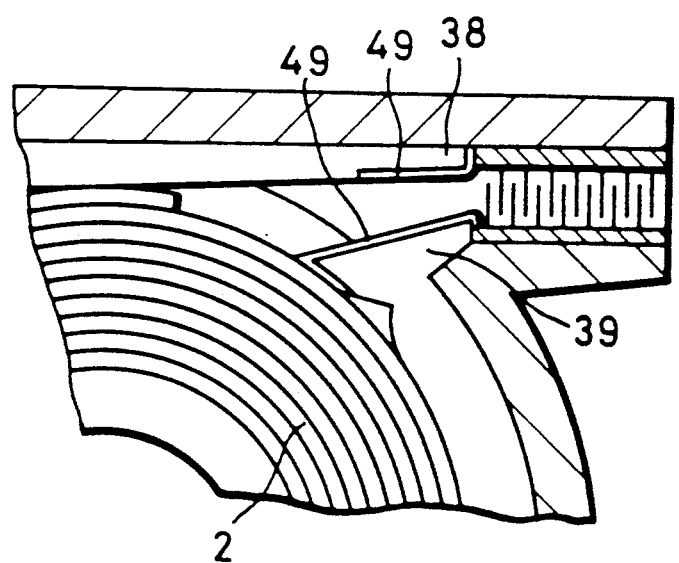
FIG. 16 is a cross section illustrating the tenth preferred embodiment in which crystalline-resinous sheets are attached.

In FIG. 16 illustrating another preferred embodiment, upper and lower pairs of bulged portions 38 and 39, which are similar in the shape to the guide members 15a, 15b, 16a and 16b, are formed from non-crystalline resin integrally with the cassette shell 5. Crystalline resin sheets 49 are attached to surfaces of the bulged portions 38 and 39 for contact with the film 2. Although only the right side is illustrated in FIG. 16, the bulged portions 38 and 39 and the resinous sheets 49 are also associated with the left side. It is preferable that the sheets 49 be 0.05 to 0.2 mm thick, and of flexible, elastic and easily workable material.

In this cassette, the sheets 49 are in contact with the film 2 on its lateral edges during its passage through the passageway 6, so that the film 2 is kept free from scratches without contact with the passage surface 6a or 6b. Although the sheets 49 in the present embodiment are made of crystalline resin, alternatively appropriate fabric may be attached to the bulged portions 38 and 39, i.e. fabric woven or knitted from synthetic fiber formed from crystalline resin, or woven or knitted fabric having pile threads made from crystalline resin.

To prevent the roll from loosening, the above embodiment is provided with the arcuate ridges in the roll chamber. The present invention, however, is applicable to a cassette having spool flanges for preventing the roll from loosening. The present invention is applicable not only to the cassette of which rotation of the spool causes the leader to advance outside the cassette, but also to a cassette of any type with a cassette shell molded from resin. The arcuate ridges may be formed separately from the cassette shell, and may be formed from crystalline resin, like the above guide members.

Figure 17:
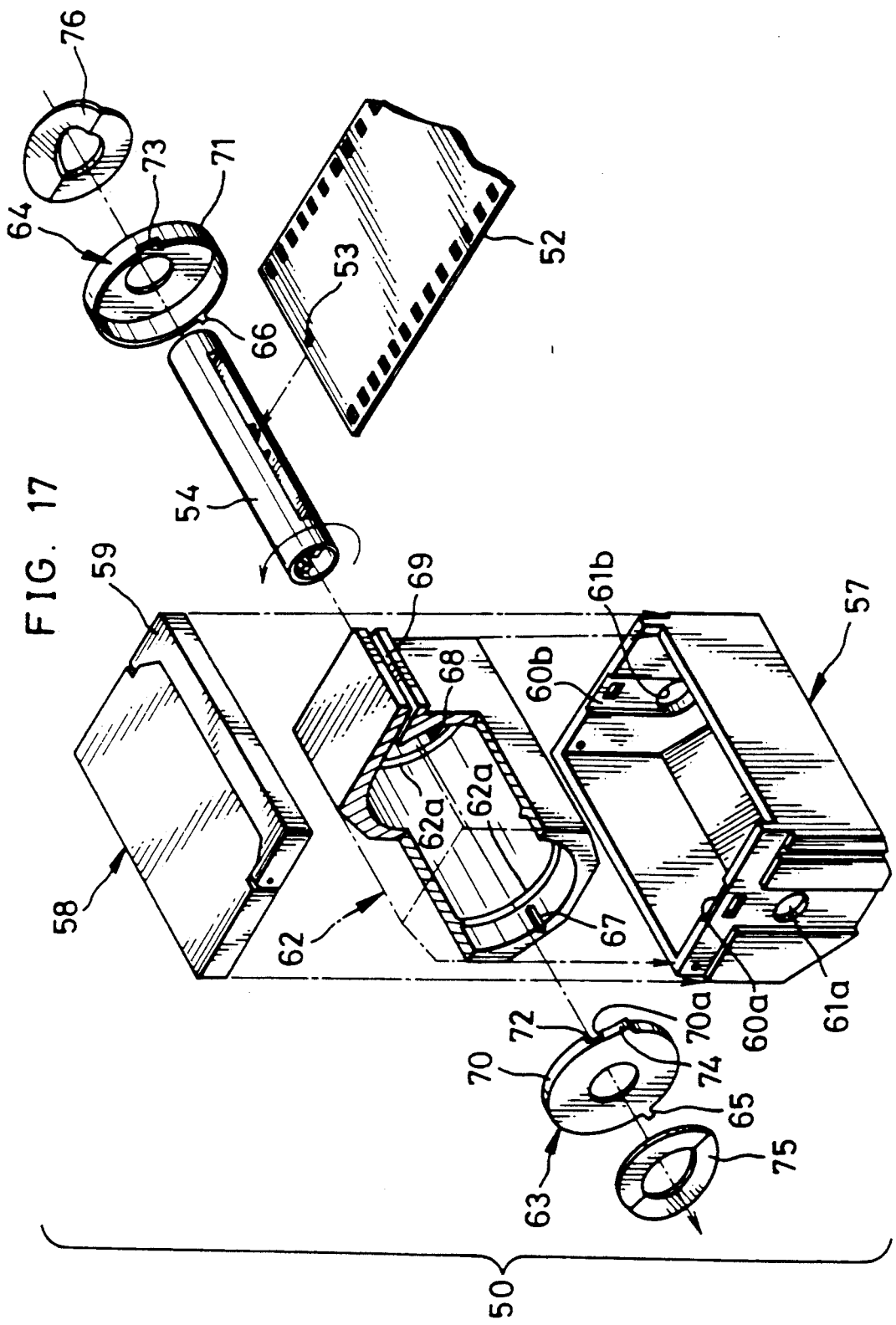
FIG. 17 is an exploded perspective view illustrating the eleventh preferred embodiments of the present invention, a cassette for containing an exposed photographic film.

FIG. 17 illustrates another preferred embodiment applied to a cassette 50 for containing an exposed photographic film 52 for the purpose of returning the film from a photofinisher and storing it after processing. The exposed film 52 has a hole 53 in its trailer, which is anchored on a spool core 54 and is wound around thereon. A cassette shell of the cassette 50 is constituted of an internal casing 62 for containing the film 52 inside, a boxed shape external casing 57, for containing the internal casing 62 therein, and a door member 58 for allowing the internal casing 62 to be inserted or removed. The door member 58 has a swingable passage door 59 for closing a film passageway 69 and for opening when the film 52 is advanced from the cassette 50. A pair of recesses 60a and 60b are formed inside the external casing 57 for receiving both ends of the core 54 and supporting them rotatably. A pair of holes 61a and 61b are formed in each end face of the external casing 57 so as to be positioned at the bottom of the recesses 60a and 60b, for facilitating rotation of the core 54 from the exterior without removing the internal casing 62 from the external casing 57.

A pair of disks 63 and 64, formed from HDPE or the like, are disposed on both ends of the inside of the internal casing 62. Projections 65 and 66 are formed on disks 63 and 64 respectively so as to be coupled with grooves 67 and 68 formed in the internal casing 62 for preventing the disks 63 and 64 from rotating relative to the internal casing 62. Spring washers 75 and 76, bent in a V-shape are fitted on the core 54 outward from the disks 63 and 64 respectively so as to press the disks 63 and 64 against the roll of the film 52. The passageway 69 is defined in the internal casing 62 in a lengthwise direction so as to interconnect the inside of the internal casing 62 and the outside of the cassette 50 for allowing passage of the film 52.

The disks 63 and 64 have holes at their center, and circumferential lips 70 and 71 formed to project from their periphery toward the roll of the film 52. The lips 70 and 71 are in contact with the outermost turn of the film 52 wound on the core 54, so as to prevent the roll from loosening. A pair of annular ridges 62a may be formed on the inside of the internal casing 62 for reducing the diameter of the roll of the film 52. Cutoffs 72 and 73 are formed on lips 70 and 71 in positions corresponding to the passageway 69. The cutoffs 72 and 73 define a passage for passing the longitudinal edges of the film 52 through the lips 70 and 71. The right-hand edge of the cutoff 72 in FIG. 17 tapered so as to act as a separator 70a for abutment upon the leader of the film 52 for separating it from the inner roll. A reference numeral 74 designates a curved projection for guiding the leader as separated by the separator 70a to the passageway 69.

Referring to the operation of the cassette 50, the trailer of the film 52 is anchored on the core 54 by arresting the trailer hole 53. The core 54 is inserted in a roll chamber inside the internal casing 62, in the direction of the arrow in FIG. 17, while the film 52 is inserted in the passageway 69 in the same direction. The disks 63 and 64 are fitted on the internal casing 62 to be received by the core 54, after which the internal casing 62 is inserted in the external casing 57. By rotating the core 54 counterclockwise, the film 52 is wound up in the internal casing 62. When the entire length of film 52 has been wound up in the internal casing 62, the door member 58 is mounted on the external casing 57.

Because the internal casing 62 is formed from HDPE which has a small coefficient of friction, the film 52 is smoothly wound up smoothly so that no scratches will be formed on the film 52. When the leader of the film 52 is drawn into the internal casing 62, the outermost turn of the roll of the film 52 is pressed by the lips 70 and 71 so that the diameter of the roll around the core 54 is reduced. The film 52 is thus contained in the internal casing 62 without loosening of the roll.

To advance the film 52 from inside the cassette 50, the passage door 59 is opened. The core 54 is then rotated clockwise in FIG. 17. The roll of the film 52 is kept from loosening by the disks 63 and 64, so that the leader of the film 52 rotates clockwise within the internal casing 62 in accordance with rotation of the core 54. The leading end abuts on and is separated by the separator 70a, and is then directed to the outside of the cassette 50 through the passageway 69. No scratches will form on the film 52, because it is in contact only with the internal casing 62 which has a small coefficient of friction.

Figure 18:
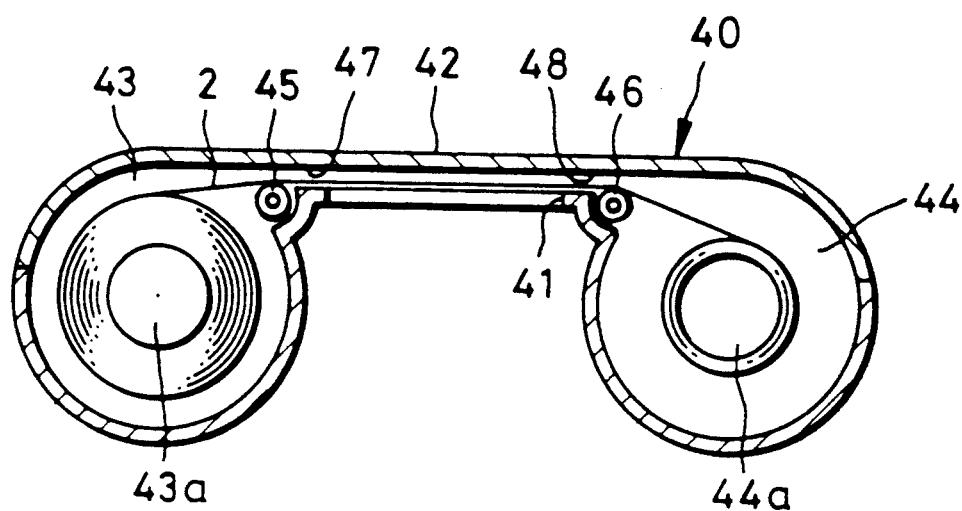
FIGS. 18 and 19 illustrate the twelfth preferred embodiments.
Figure 19:
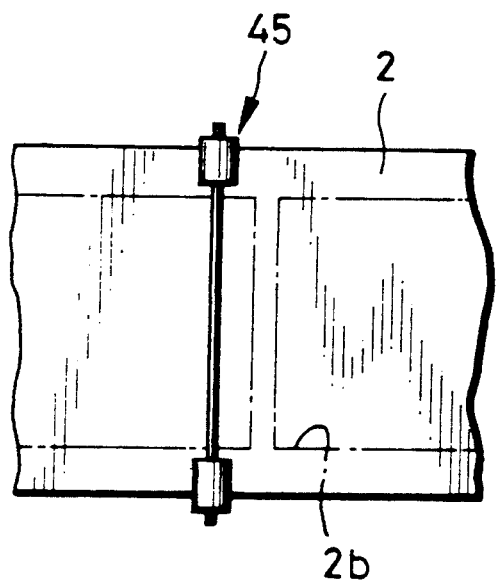

Referring to FIGS. 18 and 19 illustrating still another preferred embodiment, a cassette or cartridge 40 has a pair of roll chambers, or a film supply chamber 43 and a film take-up chamber 44. The film supply chamber 43 contains the unexposed film 2 in a roll, while the film take-up chamber 44 contains the film 2, as fed from the supply chamber 43, in a roll. Between the two chambers 43 and 44 is a bridge portion 42 in which the film 2 is passed through a passageway between the two chambers 43 and 44. The bridge portion 42 has an exposure aperture 41 at which the image frame or recording area 2b of the film 2 within the bridge portion 42 is positioned to allow for exposing the image frame 2b.

Spools 43a and 44a are rotatably disposed in the roll chambers 43 and 44 respectively. The trailer of the film 2 is anchored on the spool 43a, whereas the leader is anchored on the spool 44a. An upstream passage mouth 47 interconnects the film supply chamber 43 and the passageway within the bridge portion 42. A downstream passage mouth 48 connects the take-up chamber 44 with the passageway. The passage mouths 47 and 48 are similar to the passage mouth 12 of the above-described cassettes 1 and 22. Two coaxial rollers are rotatably disposed within the film supply chamber 43 inward from the passage mouth 47, and two coaxial rollers 46 are rotatably disposed within the take-up chamber 44 inward from the passage mouth 48. The rollers 45 are in contact with the respective longitudinal edges of the film 2, but are prevented from coming into contact with the recording areas 2b by a shaft which axially supports the rollers 45, as illustrated in FIG. 19. The rollers 46 also have a shaft (not shown), and operate in a manner similar to the rollers 45.

The operation of the cassette 40 will now described. When the spool 44a is rotated clockwise by a fork of a camera, the film 2 is transported from the supply chamber 43 to the take-up chamber 44. During this transport, the film 2 is pressed within the bridge portion 42 to the side of the exposure aperture 41 by the tension applied to the film 2. The film 2, however, is in contact with the rollers 45 and 46, which prevent the film 2 from being rubbed against the inside surface of the bridge passageway. Rotation of the rollers 45 and 46 maintains a smooth the wind-up operation of the film 2, so that no scratches will ever take place on the film 2. During the backward transportation from the take-up chamber 44 to the supply chamber 43, the rollers 45 and 46 also rotate to protect the film 2 from scratches. Of course, the rollers 45 or 46 may also be used in a cassette like the cassette 1 or 22, having a single spool, a single roll chamber and a single film passageway.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A photographic film cassette comprising:
   a cassette shell having a roll chamber defined therein, said cassette shell being formed of a first material having a first elasticity;
   a spool having photographic film wound in a roll thereon, said spool being rotatably contained in said roll chamber;
   a separator member attached to said cassette shell proximate said roll chamber and a film passageway defined in said cassette shell, said film passageway extending between said roll chamber and an exterior of said cassette sell, said separator member being in contact with an outside of said roll of said film so as to abut upon a leading end of a leader of said film when said spool is rotated in an unwinding direction, said leader being separated from said roll by said separator member, when said said spool is rotated, so as to advance said leader to said exterior of said cassette shell through said film passageway, said separator member being formed of a second material having a second elasticity which is higher than said first elasticity so as to be flexible in response to contact with said leader.

2. A photographic film cassette as claimed in claim 1, wherein said cassette shell comprises two resinous shell halves.

3. A photographic film cassette as claimed in claim 2, wherein said separator member is disposed proximate a side of said passageway with reference to an axial direction of said spool.

4. A photographic film cassette as claimed in claim 3, wherein a length of said separator member in said axial direction is larger than a length of perforations of said film in said axial direction in order to prevent said separator member from being engaged in said perforations.

5. A photographic film cassette as claimed in claim 4, wherein said separator member is a separator claw formed integrally with said cassette shell, and a connecting portion of said separator claw is formed for connecting said separator claw to said cassette shell, said connection portion having a thickness D in a direction vertical to the advancing of said film, which is smaller than remaining portion of said separator claw.

6. A photographic film cassette as claimed in claim 5, wherein said thickness D is less or equal to than 0.3 mm.

7. A photographic film cassette as claimed in claim 6, wherein an upper surface of said separator claw is convex relative to said lower surface of said passage and an upper surface of said connecting portion.

8. A photographic film cassette as claimed in claim 6, wherein an upper surface of said separator claw is an integral extension of said lower surface of said passage.

9. A photographic film cassette comprising:
   a cassette shell comprising two resinous shell halves and having a roll chamber defined therein, said cassette shell being formed of a first resinous material having a first elasticity;
   a spool having photographic film wound in a roll thereon, said spool being rotatably contained in said roll chamber;
   a separator member disposed proximate said roll chamber and a film passageway defined in said cassette shell, said separator member being a plastic sheet positioned proximate a side of said film passageway with reference to an axial direction of said spool, said film passageway extending between said roll chamber and an exterior of said cassette shell, said separator member being in contact with an outside of said roll of said film so as to abut upon a leading end of a leader of said film when said spool is rotated in an unwinding direction, said leader being separated from said roll by said separator member, when said said spool is rotated, so as to advance said leader to said exterior of said cassette shell through said film passageway, said separator member being formed of a second material having a second elasticity which is higher than said first elasticity so as to be flexible in response to contact with said leader, a length of said separator member in said axial direction of said spool, being larger than a length of perforations of said film in said axial direction of said spool in order to prevent said separator member from being engaged in said perforations.

10. A photographic film cassette as claimed in claim 9, wherein said separator member is substantially rectangular, and corners of a distal edge of said separator member are rounded off.

11. A photographic film cassette as claimed in claim 10, wherein said separator member is secured to said cassette shell according to insert molding.

12. A photographic film cassette as claimed in claim 10, wherein said separator member is secured proximate said film passageway by being bent into two portions such that an upper surface of one of said portions of said separator member is flush with a lower inside surface of said passageway.

13. A photographic film cassette as claimed in claim 10, wherein said separator member is secured on a lower surface of said passageway.

14. A photographic film cassette as claimed in claim 13, further comprising light-trapping fabric attached to said lower surface, said separator member is an extension of base fabric of said light-trapping fabric.

15. A photogrphic film cassette as claimed in claim 13, wherein said separator member is thermowelded to said lower inside surface of said film passageway.

16. A photographic film cassette as claimed in claim 13, wherein said separator member is secured to said cassette shell by inserting a projection formed in said passageway into a hole formed in said separator member.

* * * * *